United States Patent Office 3,432,472
Patented Mar. 11, 1969

3,432,472
DYEABLE POLYMERS
John R. Caldwell, Kingsport, Tenn., assignor to Eastman Kodak Company, Rochester, N.Y., a corporation of New Jersey
No Drawing. Filed Oct. 30, 1963, Ser. No. 319,990
U.S. Cl. 260—75          31 Claims
Int. Cl. C08f 45/14, 47/00; C08g 53/00

ABSTRACT OF THE DISCLOSURE

A dyeable composition comprising a fiber and film-forming synthetic resinous polymer that is normally difficult to dye with basic dyes, and a salt of an oxyacid of sulfur or phosphorus.

---

This invention relates to the manufacture of improved poly-α-olefin, polyester, and acrylonitrile polymer compositions, fibers, films and other shaped articles which are readily dyeable with basic dyes.

It is known that poly-α-olefins, polyesters and acrylonitrile polymers containing 50% by weight or more of acrylonitrile have relatively poor affinity for most commercial types of dyes, for example, they show little or no affinity for basic dyes. Accordingly, various modifications have been proposed to improve the dyeing properties of these polymers. For example, sulfonated compounds have been applied on the surface of poly-α-olefins as antistatic agents, surfactants, etc. However, such compositions are not dyeable in a practical sense because the dye is confined to the surface of the polymer particle or shaped article and readily comes off under ordinary conditions of use. In the case of polyesters, it has been proposed to modify the polyesters by using as a reactant a monocarboxylic or dicarboxylic acid that contains one or more sulfonic acid salt groups. These acids are chemically combined in the polyester molecule by reaction of the carboxyl groups with the glycol component. This method of improving the dyeing properties of polyesters entails many disadvantages. For example, it is well known that the sulfonic acids used to prepare these polyesters are difficult to prepare and purify. Furthermore, such compounds are thermally unstable and the extent of their decomposition depends upon the time and temperature of heating. When the sulfonic acid derivative is employed as a reactant, it must be present during the entire reaction time required to prepare the polyester, and hence is exposed to temperatures in the range of 270–300° C. for periods up to several hours. It is apparent that extensive decomposition can take place under these conditions. As to the acrylonitrile polymers, fibers thereof having an affinity for basic dyes have been reportedly obtained by using a polymerization catalyst-promoter combination which leaves a dyeable group attached to the polymer molecule. Such combination is, for example, ammonium persulfate-sodium bisulfite which leaves a sodium salt of a sulfonic acid attached to the polymer chain as a dye receptive site. However, this process has several disadvantages such as a limitation in the choice of catalyst-promoter combination, a limitation on the method of polymerization, and a necessity to closely control polymerization conditions.

I have now found that poly-alpha-olefins, polyesters, and acrylonitrile polymers containing 50% by weight or more of acrylonitrile compositions having excellent affinity for basic dyes are obtained by incorporating certain salts, as dispersions, in the solutions or melts of the polymers prior to spinning, extruding or other shaping operations. Those of the above polymers that are in partially or completely crystallized form are included.

The salts are derived from an organic radical having a molecular weight of 150 or higher and an acidic radical containing phosphorus or sulfur, for example, phosphate, phosphonate, sulfate or sulfonate radicals. Such salts are normally insoluble in the polymeric substrates. This offers the advantage of providing discrete sites for dye affinity, which is particularly advantageous for basic dyes. The salts impart affinity for some premetallized dyes. They also improve the wettability of the fibers and impart resistance to soiling. Moreover, our salt-containing fibers can be dyed readily to heavy shades using conventional dyeing procedures. These dyed fibers show excellent fastness properties toward gas, light, laundering and dry cleaning and show no tendency to crock or bleed. They are readily processible on pickers, cards, looms, spinning and knitting machines and other textile machinery. Since the modifying agent or salt is incorporated directly in the finished polymer, most of the difficulties and shortcomings set forth above for previously proposed methods of improving the basic dye affinity of the polymers are eliminated.

In many cases, the modifying agents (salts) used in my invention are soluble in water. Hence, it would ordinarily be expected that they would wash out of the fiber during the dyeing process or when the fiber is exposed to water under any conditions. It was, therefore, surprising to find that the salt remains in the fiber under the usual conditions of processing. It was further surprising to find that the salt forms a stable complex with the dye molecule and that this complex is fast toward laundering, dry cleaning and crocking. In other words, the modifying agents of my invention, although they are only mechanically dispersed in the polymer, function as though they were chemically combined in the polymer molecule. It is thus apparent that my invention represents an entirely new concept in polymer technology, that is, imparting affinity for basic dyes by means of the above-mentioned dispersed salts.

It is, accordingly, an object of the invention to provide novel, practical and satisfactory poly-α-olefin, polyester and acrylonitrile polymer (containing at least 50% by weight of acrylonitrile) compositions adapted to be formed into fibers, filaments, films and other shaped articles which can be satisfactorily dyed with basic dyes.

Another object is to provide fibers, filaments and yarns from the above compositions susceptible of being dyed by basic dyes to shades which are gas fast, light fast and wash fast and show no tendency to crock or bleed.

Another object is to provide fibers, filaments and yarns from the above compositions susceptible of permanent dyeing with basic dyes and readily processible on pickers, cards, looms, spinning and knitting machines and other textile machinery.

Another object is to provide a novel and practical method for preparing the above compositions and dyed shaped articles.

Other objects will become apparent hereinafter.

In accordance with the invention, these objects are accomplished by incorporating with the polymer to be rendered dyeable by basic dyes a salt, or mixtures of two or more salts, of an oxyacid of sulfur or phosphorus having a dissociation constant greater than $10^{-3}$ and represented by the general formula:

(I)                RXM wherein R represents an organic radical or radicals having a total molecular weight of about from 150 to 1,000, e.g., phenyl, naphthyl, anthryl, etc. radicals that may also be substituted by one or more alkyl, aryl or halogen substituents such as p-tert-butylphenyl, p-octaphenyl, dichlorophenyl, o-, m- or p-phenylphenyl, 4-isopropylnaphthyl, etc. radicals, and generally similar radicals that may also contain heteroatoms such as N, O, or S, e.g., radicals of alkanedicarboxylic acid esters such as represented by dioctylsuccinic acid radical, etc., X represents the acidic radical of the oxyacids of phosphorus or sulfur, and M lithium, sodium, potassium, cesium, etc., ions, or an ion derived from an alkaline earth metal, e.g., zinc, cadmium, calcium, magnesium, etc. ions, an ammonium radical (—$NH_4$), or a molecule of an organic amine such as a primary, secondary or tertiary amine of from 1–20 carbon atoms, a heterocyclic tertiary amine such as pyridine, quinoline, piperidine, etc. The radical R may also contain ester groups having a hindered structure, for example, neopentyl structure such as described in Caldwell and Gilkey application Ser. No. 796,198, filed Mar. 2, 1959 (now abandoned). The radical R can also be polyvalent and may contain two or more acid radicals. The radical M can also represent aniline, N,N-dialkylanilines, etc.

More specifically, the preferred salt compounds of the invention may be defined as the alkali metal, alkaline earth metal, ammonium and organic amine salts of oxyacids of phosphorus and sulfur having dissociation constants greater than $10^{-3}$, represented, for example, by phosphoric, phosphorous and phosphonic acids of the general structures:

(II) 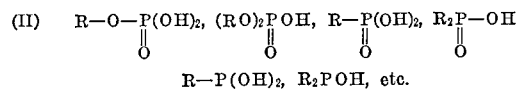

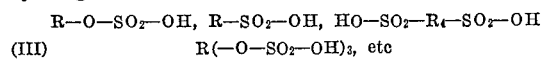

and acid sulfate and sulfonic acid derivatives represented by the general structures:

R—O—$SO_2$—OH, R—$SO_2$—OH, HO—$SO_2$—$R_4$—$SO_2$—OH (III)  R(—O—$SO_2$—OH)$_3$, etc wherein R is as previously defined and $R_4$ represents a divalent organic radical having a molecular weight above 150. The aromatic sulfonic acids are of particular value and may contain alkylated benzene and naphthalene structures. Compounds containing two or more naphthalenesulfonic acid nuclei connected by methylene bridges are of value. Mixtures of two or more of these salts can also be used. Reference can be had to G. M. Kosolapoff, "Organophosphorus Compounds" (1950), for the preparation of phosphorus acids of above structure II.

Suitable salts coming within the above structures I, II and III include the potassium salt of di(p-tert-butylphenyl) phosphoric acid, the barium salt of di(p-tert-butylphenyl) phosphoric acid, the disodium salt of amylnaphthyl phosphoric acid, sodium diphenyl phosphate, sodium salt of dodecylbenzenesulfonate, sodium salt of anthraquinone-β-sulfonic acid, Aerosol OS (isopropyl naphthalene sodium sulfonate), Aerosol OT (dioctyl sodium sulfosuccinate), Nekal BA–75 (alkylnaphthalene sodium sulfonate), RWA 300 (monobutyl diphenyl sodium monosulfonate), Alipal CO–433 (alkylphenoxypolyoxyethylene sodium sulfate), Alkanol S Flakes (sodium tetrahydronaphthalene sulfonate), Duponol ME (lauryl alcohol sulfate), Santomerse 1 (dodecylbenzene sodium sulfate, dodecylbenzene lithium sulfate, dodecylbenzene potassium sulfate or dodecyl barium sulfonate), ester from 2 moles of m-sulfobenzoic acid monolithium salt and 1 mole of 2,2,4,4-tetramethyl-1,3-cyclobutanediol, sodium salt of di(2,2-diethylamyl) ester of sulfosuccinic acid, the compound of the structure

sodium salt of N,N-dioctylamide of o-sulfobenzoic acid, the lithium salt of N,N,N',N'-tetrahexylamide of sulfoisophthalic acid, Tamol SN (methylene polynaphthalene sodium sulfonate), Daxad No. 11 (a polymerized alkylated arene sodium sulfonate), sodium octadecyl sulfate, 2-naphthalene magnesium sulfonate, barium di(2-ethylhexyl)phosphate, monobutyl biphenyl sodium sulfonate, naphthalene calcium sulfonate, sodium salt of di(2,2-dimethylhexyl) ester of 5-sulfoisophthalic acid, and the like. Many of these salts as indicated are commercially available in the form of anionic surfactants and detergents. A detailed list of such compounds is given in the book "Detergents and Emulsifiers," J. W. McCutcheon, Morristown, N.J. (1962).

As indicated above in accordance with my invention from 0.1–25 percent by weight and preferably 2–15 percent, based on the weight of the total composition, of the salt compound represented by above structures I, II and III is incorporated in the poly-α-olefin polyester or acrylonitrile polymer. There are numerous ways of incorporating or blending the salt additive with the polymeric material. One method of obtaining a suitable blend or dispersion is to slurry the powdered polymer in a liquid dispersion or solution of the salt, as for example, a 5% solution of the salt in water. The slurry is then evaporated to dryness leaving the salt compound attached to or coating the polymer. The resultant powder can then be melt spun or extruded into fibers or filaments or into films and other shaped articles which will have a uniform dispersion of the salt therein and will dye readily with basic dyes.

Another method of incorporating the salts in the polymers is to mill the salt with the polymer on hot rolls or in a suitable hot mixer. The salt is added as a solution, a dispersion, or in powdered form to the polymer as it is being milled on the hot rolls and while it is in a fluid state. The polymer containing the dispersed salt can then be extruded into fibers, films or other shaped products which can be permanently and satisfactorily dyed with basic dyes.

In still another method for obtaining an intimate mixture or blend of the polymer and the salt additive, the salt is dissolved or suspended in a hot solution of the polymer. In this case a solvent is employed which will dissolve the polymer when hot, but which is a nonsolvent for the polymer when cold. When the hot mixture is cooled, the polymer precipitates out of the solution and carries with it the salt as a fine dispersion in the polymer particles. The polymer is then filtered and dried. The dry product may then be extruded into fibers or films which, on drafting and crystallizing, can be readily dyed with basic dyes.

The invention also contemplates three-component systems comprising the polymer to be modified, a salt of above structures I, II or III, and another polymeric material. In a typical case, the salt may be mixed with a poly-(alkylene oxide) type of surfactant which acts as a protective colloid and promotes the dispersion of the salt as small particles in the polymer matrix. For example, the sodium salt of an alkylated benzenesulfonic acid is dissolved in water and Carbowax 4000 or Igepal CO–880 is added to the solution. This solution is then evaporated on the polymer granules. The sulfonic acid compound is deposited as colloidal particles which readily pass through spinnerets. The fibers obtained likewise can be readily dyed with basic dyes.

The preferred poly-α-olefins susceptible of being given an affinity for basic dyes in accordance with my invention are those that can be crystallized. The preparation and characteristics of such polymers are described by Natta in Makromolecular Chemie, 16, 213 (1955) and Angew. Chem., 68, 393 (1956); J. Poly. Science, 21, 547 (1956) and in Skinners' Silk and Rayon Record, 30, No. 4, 134 (1956). Examples of suitable poly(α-olefins) include polyethylene, polypropylene, polystyrene, poly(allylbenzene), poly(allylcyclohexane), poly(vinylcyclohexane), poly(allylcyclopentane), poly(4-methylpentene-1), etc. Copolymers of two or more α-olefins can be used in the process of the invention. Thus, for example, propylene copolymers containing up to 30 percent of propylene, butylene, isobutylene, 1-hexene, 4-methylpentene-1, styrene or vinylcyclohexane can be used. The α-olefin copolymers may be of the random, block or segmented type.

The polyesters susceptible of being given an affinity for basic dyes in accordance with my invention include practically any of the known high molecular weight polyesters that are suitable for fiber- and film-forming preparations.

For example, U.S. Patent 2,465,319 and many subsequently issued patents such as U.S. Patent 2,727,881 describe general processes for the preparation of polyesters in great detail. Typical polyesters for use in my invention are those obtained by reacting glycols with aromatic dicarboxylic acids such as terephthalic, 4,4'-dicarboxydiphenyl, 4,4'-sulfonyldibenzoic, 1,2-di(p-carboxyphenyl) ethane, 1,2-di(p-carboxyphenyloxy) ethane, naphthalene dicarboxylic acids, and the like. Suitable glycols include the polymethylene glycols such as ethylene glycol, trimethylene glycol, tetramethylene glycol, pentamethylene glycol, hexamethylene glycol, decamethylene glycol, etc. Alicyclic glycols such as guinitol, norcamphanediols, 1,4-cyclohexanedimethanol, etc. can be used. Modified polyesters of the above type may be obtained by replacing the aromatic dicarboxylic acid with up to about 50 mole percent of an alkanedicarboxylic acid, e.g., adipic acid, sebacic acid, etc. My process is applicable to high-melting crystalline polyesters, as well as to noncrystalline or slightly crystalline polyesters. The latter polyesters include polycarbonates of bisphenols, the polyterephthalates of bisphenols and the polyisophthalates of bisphenols. However, as indicated, the process of my invention is of such general utility that it may be applied advantageously to any type of polyester regardless of composition to render such polyesters readily dyeable by basic dyes.

The acrylonitrile polymers containing at least 50% by weight of acrylonitrile that can be rendered dyeable by basic dyes in accordance with the process of the invention include polyacrylonitrile and various copolymers of acrylonitrile and other monoethylenically unsaturated, polymerizable comonomers containing a —CH=C< group, and more especially a $CH_2$=C< group such as vinyl and isopropenyl esters, e.g., vinyl acetate, vinyl propionate, vinyl butyrate, vinyl benzoate, isopropenyl acetate, etc., acrylic and methacrylic acids, alkyl acrylates and methacrylates, e.g., methyl, ethyl, butyl, dodecyl, etc., acrylates and corresponding methacrylates, acrylonitrile, methacrylonitrile, acrylamide, methacrylamide, N-alkyl and N,N-dialkyl substituted acrylamides and methacrylamides, styrene, α-methylstyrene, vinyl pyrrolidone, vinyl halides, e.g., vinyl chloride, bromide, fluoride, etc., vinylidene halides, e.g., vinylidene chloride, vinylidene fluoride, etc., vinyl alkyl ethers, e.g., vinyl methyl ether, vinyl ethyl ether, etc., vinyl alkyl ketones, e.g., vinyl methyl ketone, vinyl butyl ketone, etc., vinyl sulfonamides, monoalkyl and dialkyl esters of maleic, fumaric, itaconic and citraconic acids, and the like. Various acrylonitrile graft copolymers containing 50% by weight or more of acrylonitrile can also be rendered dyeable by basic dyes by the process of the invention. The copolymers containing from about 50–95% by weight of acrylonitrile and from about 50–5% of one or more of the above-mentioned comonomers are particularly well adapted for modification to have affinity for basic dyes by the process of the invention.

Reference has been made in the above examples to dyeing the polymers concerned with basic dyes. Suitable basic dyes include: Sevron Blue B (C.I. No. Basic Blue 21), Sevron Brilliant Red 4G (C.I. No. Basic Red 14), Sevron Green B (C.I. No. Basic Green 3), Sevron Yellow L (C.I. No. Basic Yellow 13), Auramine SP (C.I. No. Basic Yellow 2), Calcozine Orange RS (C.I. No. Basic Orange 1), Rhodamine 5G (C.I. No. Basic Red 1), Bismarck Brown (C.I. No. Basic Brown 4), and Methyl Violet (C.I. No. Basic Violet 1).

The following examples will serve further to illustrate the manner whereby I practice my invention.

POLY-α-OLEFINS CONTAINING MODIFYING SALTS

Example 1

One molecular proportion of tri(p-tert-butylphenyl) phosphate and one molecular proportion of KOH were refluxed for 6 hours in alcohol solution. The alcohol and water were removed by heating the solution on the steam bath. The p-tert-butylphenol was removed by heating the residue in vacuum. The product consisted essentially of the potassium salt of di-(p-tert-butylphenyl)phosphoric acid,

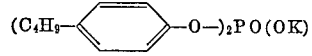

(A) Ten g. of the potassium salt was dissolved in a mixture of 100 cc. water and 100 cc. ethyl alcohol. The solution was stirred with 90 g. of finely-divided polypropylene (crystallizable type) and the solvent was evaporated. A thin coating of the salt was deposited on the polymer particles. Fibers were made by melt extrusion of the treated polymer. After drafting and heat-setting, they dyed well with basic dyes. Similar dyeing properties were obtained with extruded and drafted films.

Basic dyes that can be used to color the compositions include Sevron Blue B (C.I. No. Basic Blue 21), Sevron Brilliant Red 4G (C.I. No. Basic Red 14), Sevron Green B (C.I. No. Basic Green 3), Sevron Yellow L (C.I. No. Basic Yellow 13), Auramine SP (C.I. No. Basic Yellow 2), Calcozine Orange RS (C.I. No. Basic Orange 1), Rhodamine 5G (C.I. No. Basic Red 1), Bismarck Brown (C.I. No. Basic Brown 4) and Methyl Violet (C.I. No. Basic Violet 1).

(B) Ten g. of the potassium salt in alcohol-water solution was applied on particles of crystallizable polystyrene (90 g.) as described in A above. Fibers were melt-spun from the blend. They dyed well with basic dyes.

(C) Fifteen g. of the potassium salt, as a 200-mesh powder, was mixed with 85 g. of crystallizable poly(4-methylpentene) on hot rolls, in a nitrogen atmosphere. Fibers spun from the blend dyed well with basic dyes.

(D) Six g. of the potassium salt was deposited on 94 g. of powdered poly(allylbenzene) as described in A above. Fibers made from the blend dyed well with basic dyes.

Example 2

The barium salt of di(p-tert-butylphenyl)phosphoric acid was prepared by treating the potassium salt with barium chloride.

(A) Fifteen g. of the barium salt was milled with 85 g. of crystallizable polypropylene on the hot rolls. The blend was extruded to give fibers and films that dyed well with basic dyes.

(B) Twelve g. of the barium salt was milled with 88 g. of low-pressure polyethylene. Films and fibers made from the blend dyed well with basic dyes.

(C) Eight g. of the barium salt was applied to the surface of particles of poly(vinylcyclohexane) by the slurry method. Films and fibers made by melt extrusion dyed well with basic dyes.

(D) Ten g. of the barium salt was applied to the surface of polystyrene particles. Fibers made from the blend dyed well with basic dyes.

Example 3

Amylnaphthol-2 was treated with excess $POCl_3$ and the product was hydrolyzed to form amylnaphthylphosphoric acid. This compound was neutralized with sodium hydroxide to make the disodium salt,

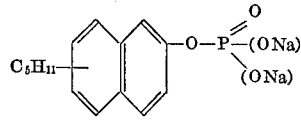

(A) Ten g. of the salt was dissolved in a mixture of 60–40 alcohol-water and the solution was evaporated on 90 g. of powdered poly(allylbenzene). Films and fibers were made by melt-extrusion. They dyed well with basic dyes.

(B) Five g. of the salt was milled with 95 g. of polypropylene in a Banbury mixer. The blend was extruded as a rod ⅛" in diameter and the rod was cut into sections ¼" long. The pellets were melt-extruded as filaments. After being drafted and heat-set, the fibers dyed well with basic dyes.

Example 4

Twenty g. of the sodium salt of diphenylphosphoric acid was applied to the surface of 180 g. of polypropylene by the slurry method. Fibers made from the blend dyed well with basic dyes.

Example 5

A polyamide was made from 0.8 mole caprolactam, 0.6 mole hexamethylenediamine and 0.6 mole adipic acid. Ten parts of the polyamide and 5 parts of sodium diphenylphosphate were blended with polypropylene (crystalline type) on the hot rolls. Fibers made from the blend dyed well with basic dyes and premetallized dyes.

Example 6

Crystalline polypropylene powder with an inherent viscosity of 1.06, as measured in tetralin at 145° C., was coated with 5% Tamol SN and 2% Triton X100. These products are surfactants. The Tamol SN is a methylene polynaphthalene sodium sulfonate. The Triton X100 is a p-diisobutylphenoxypolyethylene glycol whose main function is to aid in dispersing the Tamol SN in the polypropylene matrix. The shearing and mixing action obtained by melt spinning the coated polypropylene using a screw extruder gave a good dispersion of the additives thoroughout the polypropylene fiber cross section. The fibers were drawn 4 times their original length in steam and the drafted yarn was knitted into a tube. A 3% dyeing of Sevron Brilliant Red 4G (C.I. No. Basic Red 14) on this knit tube for 1 hour at the boil gave a deep shade, whereas, a 3% dyeing on unmodified polypropylene sock showed no dyeing.

Example 7

A dispersion of 4% dodecylbenzenesulfonate, sodium salt and 2% Triton X100 in polypropylene fibers was obtained by the procedure described in Example 6. Three percent dyeings of Sevron Yellow L and Sevron Brilliant Red 2B on knit tubes prepared from these fibers produced medium to heavy shades of the basic dyes.

Example 8

Crystalline polypropylene with an inherent viscosity of 2.1 was blended with Aerosol OS (for isopropyl naphthalene sodium sulfonate) and Triton X100 in a Banbury mixer. The blend time was 6 minutes and the maximum temperature reached was 140° C. The blend contained 20% by weight of Aerosol OS and 10% by weight of Triton X100. This master batch blend was granulated to a particle size of ⅛ in. or less. One part of the master batch was physically mixed with 4 parts of crystalline polypropylene with an inherent viscosity of 1.06. The physical mixture was melt spun into fibers. The additives were intimately dispersed throughout the polypropylene fiber cross section as revealed by examination of a micro section under an electron microscope.

Three percent dyeings of the modified polypropylene fibers using Sevron Yellow L, Sevron Brilliant Red 4G, Sevron Blue BGL, Sevron Orange G, and Sevron Brown YL produced uniform medium to heavy shades in the fiber of the corresponding dye.

Example 9

A mixture of crystalline polypropylene with an inherent viscosity of 2.1, Daxad No. 11 (a polymerized alkylated arene sodium sulfonate), and Triton X100 in the ratio of 96/3/1 parts by weight were melt blended by extrusion in a screw extruder at 280° C. The extruded rod was pelleted and the pellets were then melt spun into fibers. An intimate dispersion of the additives in the polypropylene fibers was obtained. Good shades of dyeing were obtained with basic dyes such as those previously mentioned. The use of a dyeing assistant such as benzyl benzoate in the dye bath increased the depth of dyeing.

Example 10

Five percent dodecylbenzene sodium sulfonate and three percent Triton X100 were dispersed in fibers of crystalline polystyrene, poly-4-methyl-1-pentene, poly-1-butene, poly-3-methyl-1-butene, polyvinylcyclohexane, polyallylbenzene, and polyethylene by the method described in Example 6. All of these compositions dyed with basic dyes to uniform shades due to the presence of the intimately dispersed sulfonic acid dyeable sites.

EXAMPLE 11

Sodium octadecyl sulfate was used as described in Example 6.

POLYESTERS CONTAINING MODIFYING SALTS

Example 12

Three g. of Carbowax 4000 (trade name for polyethylene glycol of 4000 molecular weight) and 4.5 g. of sodium diphenyl phosphate were dissolved in a mixture of acetone and water. To this solution was added 142.5 g. of polyethylene terephthalate (inherent viscosity=0.68) as particles with an average diameter of 0.03 inch or less. The acetone and water were evaporated while stirring the slurry to obtain a uniform coating of the additives on the polyester particles. The coated polyester was melt spun and the fibers were drafted 5 times their original length on a hot roll at 80° C. The drafted yarn was knitted into a tube. A 3% dyeing of Sevron Brilliant Red 4G (C.I. No. Basic Red 14) on this sock for 1 hour at the boil gave a medium shade of dyeing whereas a 3% dyeing on a control sample of polyethylene terephthalate was barely tinted.

Example 13

Poly-1,4-cyclohexylenedimethylene terephthalate (inherent viscosity=0.78) was used in place of the polyethylene terephthalate in Example 12. A deep shade of red was obtained when the knit tube was dyed in the presence of a dyeing assistant such as benzyl benzoate. The fiber composition was 3% sodium diphenyl phosphate and 2% Carbowax 4000 dispersed in a polyester matrix accounting for the remaining 95% of the composition. The modified polyester composition also had good resistance to soiling with oily dirt. When a piece of the knit tube was washed with a swatch of cotton which had been soiled with a mixture of carbon black, mineral oil, lard, and stearic acid, there was no soiling of the modified polyester. Unmodified poly-1,4-cyclohexylenedimethylene terephthalate was badly soiled in a similar test.

Example 14

The following polyesters were coated with a mixture of 3% dodecylbenzenesulfonate, sodium salt and 2% Carbowax 4000 by the procedure described in Example 12: polyethylene terephthalate, poly-1,4-cyclohexylenedimethylene terephthalate, polyethylene-2,6-naphthalenedicarboxylate, poly - 2,2,4,4 - tetramethyl-1,3-cyclobutylene carbonate, poly-2,2,4,4-tetramethyl-1,3-cyclobutylene terephthalate, and poly-1,5-pentamethylene-4,4'-sulfonyldibenzoate. Each of these coated polyester compositions was melt spun and a knit tube was prepared from the spun fibers. Three percent dyeings of Sevron Yellow L and Sevron Brilliant Red 2B on these knit tubes produced medium to heavy shades of the basic dyes. Control samples containing no additive were barely tinted. The polyesters containing the sulfonic acid modifier also resisted soiling with oily dirt.

Example 15

A suspension of 142.5 g. of poly-1,4-cyclohexylenedimethylene terephthalate polyester (inherent viscosity of 20 mesh particles=0.78) in a water solution containing 4.5 g. of anthraquinone-β-sulfonic acid, sodium salt and 3 g. of Carbowax 2000 was stirred with heating until the water had evaporated. The polyester particles were thus coated with the additives. The coated polyester was melt spun and a skein of the fibers dyed with Sevron Brilliant Red 4G using benzyl benzoate as a dyeing assistant. The fibers dyed to a medium shade.

Example 16

Polyethylene terephthalate and poly-1,4-cyclohexylenedimethylene terephthalate were each coated with 2% Carbowax 4000 and 5% of each of the chemicals listed below, according to the procedure described in Example 12.

Salt: Trade name
(1) Isopropyl naphthalene sodium sulfonate _____ Aerosol OS.
(2) Dioctyl sodium sulfosuccinate _____ Aerosol OT.
(3) Alkyl naphthalene sodium sulfonate _____ Nekal BA–75.
(4) Monobutyl diphenyl sodium monosulfonate _____ RWA 300.
(5) Alkylphenoxypolyoxyethylene sodium sulfate _____ Alipal CO–433.
(6) Sodium tetrahydronaphthalene sulfonate _____ Alkanol S Flakes.
(7) Lauryl alcohol sulfate, sodium salt _____ Duponol ME.
(8) Dodecylbenzene sodium sulfate _____ [1] Santomerse 1.
(9) Dodecylbenzene lithium sulfonate _____ [1] Santomerse 1.
(10) Dodecylbenzene potassium sulfonate _____ [1] Santomerse 1.
(11) Dodecylbenzene barium sulfonate _____ [1] Santomerse 1.

[1] The free acid was prepared by dissolving dodecylbenzene sodium sulfonate in alcohol; adding an equivalent amount of gaseous hydrogen chloride; and filtering off the precipitated sodium chloride. The lithium, potassium, and barium salts of dodecylbenzene sulfonic acid were then prepared by adding an equivalent amount of the corresponding metal carbonate to an aqueous-alcohol solution of the acid and evaporating to dryness.

Each of the 11 polyethylene terephthalate modifications and 11 poly-1,4-cyclohexylenedimethylene terephthalate modifications was melt spun into fibers. Skeins of these fibers dyed from medium to dark shades with selected basic dyes.

Example 17

Polyethylene terephthalate was coated with 5% of dodecylbenzene barium sulfonate and is similar to composition 11 in Example 16 except for the absence of the Carbowax 4000. This composition was melt spun into fibers which dyed readily with Sevron Brilliant Red 4G.

Example 18

Using the methods described above, polyester fibers were spun containing the modifying agents listed below.
(a) 3% of the ester made from 2 moles of m-sulfobenzoic acid monolithium salt and 1 mole of 2,2,4,4-tetramethyl-1,3-cyclobutanediol.
(b) 4% of the di(2,2-dimethylhexyl)ester of sulfoisophthalic acid, sodium salt + 1% Igepal CO–880.[1]
(c) 3% of the di(2,2-diethylamyl)ester of sulfosuccinic acid, sodium salt.
(d) 15% of the compound having the structure $$KO-SO_2-O-(CH_2CH_2O)_{20}-SO_2-OK.$$

[1] Igepal CO–880 is the trade name of a compound having the structure:

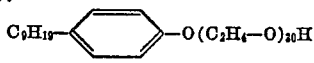

(e) 8% of the 2,2,4-trimethylpentyl ester of m-sulfobenzoic acid, sodium salt + 3% Pluronic L–44.[2]
(f) 4% of Daxad 11 + 2% Carbowax 6000.
(g) 5% of the N,N-dioctylamide of o-sulfobenzoic acid, sodium salt.
(h) 6% of the N,N,N',N'-tetrahexylamide of sulfoisophthalic acid, Li salt.
(i) 5% of the N,N'-didecylamide of sulfosuccinic acid, sodium salt.

These compounds are non-ionic wetting agents which act as supplementary dispersing agents for the sulfonate salts.

The following polyesters were used: poly(1,4-cyclohexylenedimethylene terephthalate), polyethylene terephthalate, polyethylene 2,6-naphthalenedicarboxylate and the polyesters made from 4,4'-sulfonyldibenzoic acid, as described in U.S. Patent No. 2,744,089.

Example 19

The calcium, barium, magnesium and zinc salts of the compounds described in Example 18 were used.

Example 20

A solution of 6.4 g. of Solvadine BL Conc. (an alkylated aryl sodium sulfonate) in 24.8 g. (0.4 mole) of ethylene glycol was placed in a 100 ml. flask along with 13.6 g. (0.07 mole) of dimethyl terephthalate, 5.8 g. (0.03 mole) of dimethyl isophthalate, and 0.02 g. of $Ti(O_{Iso}Pr)_4$. The flask was fitted with a stirrer, nitrogen inlet and outlet and provision for applying reduced pressure. The flask and contents were heated in a metal bath at 195° C. while stirring the reaction mixture in an atmosphere of nitrogen gas. A clear melt was obtained which stayed clear during ester interchange. When methanol ceased being evolved, the temperature of the bath was raised to 230° C. and the pressure was reduced to 0.5 mm. Hg. Stirring under vacuum was continued for 30 min. The product consisted of an excellent dispersion of the sodium salt (25%) in the polyester matrix (75%). This material was ground to a particle size of 3 mm. or less and 24 g. was blended with 76 g. of polyethylene terephthalate having an inherent viscosity of 0.69 and a particle size of 3 mm. or less. The blend was melt spun into fibers which contained 6% of the alkylated aryl sodium sulfonate. The fibers were drafted 5 times their original length on a hot roll at 80° C. A 3% dyeing of Sevron Brilliant Red 4G on the drafted fibers gave a deep shade. Polyethylene terephthalate containing 18% of the copolyester used in dispersing the salt was barely tinted with the basic dye.

Example 21

A polyester master batch containing 50% dodecylbenzene sodium sulfonate and 50% poly-2,2-dimethyl-1,3-propylene transcyclohexane-1,4-dicarboxylate polyester was prepared as in Example 20, by combining the salt with the polyester monomers and forming the polymer in the presence of the salt. The product was blended with polyethylene terephthalate to give 7% of the sodium salt in the blend. Fibers melt spun from the blend dyed readily with Sevron Yellow L and other selected basic dyes.

Example 22

The polyester master batch in Example 21 was blended with poly-1,4-cyclohexylenedimethylene terephthalate to give 7% of the dodecylbenzene sodium sulfonate in the blend. Fibers spun from the blend dyed readily with basic dyes.

ACRYLONITRILE POLYMERS OF AT LEAST 50% BY WEIGHT ACRYLONITRILE CONTAINING MODIFYING SALTS

Example 23

The following materials were placed in a 3-liter flask

[2] Pluronic L–44 is the trade name for a segmented ethylene oxide-propylene oxide copolymer.

equipped with a sweep stirrer and immersed in a water bath maintained at a temperature of 45–50° C.:

| | Grams |
|---|---|
| Acrylonitrile | 372 |
| Methyl acrylate | 28 |
| Dimethylformamide | 800 |
| Ammonium persulfate | 1.0 |

A smooth, viscous dope was obtained after 18 hours which contained 29% solids corresponding to a yield of 87% of the polymer. Half of this dope was dry-spun into fibers which were barely tinted with basic dyes such as Sevron Brilliant Red 4G and Sevron Green B.

To the other half of the dope was added 6% (based on the weight of the polymer) of sodium dodecylbenzene sulfonate (Santomerse 1) dissolved in dimethylformamide. The resulting dope was then dry-spun into fibers which dyed to a deep shade with the basic dyes mentioned above. Films and sheets also dyed well with basic dyes.

Example 24

The following materials were tumbled in a pressure bottle at 50° C. for 20 hours:

| | | |
|---|---|---|
| Acrylonitrile | g | 52 |
| Vinylidene chloride | g | 48 |
| Tert-butyl alcohol | ml | 195 |
| Water | ml | 105 |
| Ammonium persulfate | g | 0.5 |
| Azobis (isobutyronitrile) | g | 0.5 |

A white powder was obtained which after filtering, washing with isopropyl alcohol, and drying weighed 97.6 g. This powder was then dispersed in a solution of 5 g. of sodium diphenyl phosphate in a mixture of isopropyl alcohol and water. The acetone and water were then evaporated while stirring the slurry to obtain a uniform coating of the additive on the polymer. The coated polymer was then dissolved in acetone to give a slightly hazy smooth dope which was dry-spun into fibers. These fibers dyed well with basic dyes such as Sevron Yellow L and Maxillon Blue RLA.

Example 25

Using the method of Example 23, a copolymer was prepared having the composition 93 parts acrylonitrile–7 parts N-isopropylacrylamide. This polymer was wet-spun into a precipitating bath of dimethylformamide-water and followed by an aqueous bath containing 5% isopropyl naphthalene sodium sulfonate. The fibers were then drafted 5 times their original length in a hot chamber at 160° C. A 3% dyeing of Sevron Brilliant Red 4G on these fibers at the boil for 1 hour gave a medium shade of dyeing. Under the same dyeing conditions unmodified fibers of the same composition showed only a tint of color.

Example 26

The following materials were tumbled in a pressure bottle at 60° C. for 18 hours:

| | | |
|---|---|---|
| Acrylonitrile | g | 75 |
| Hexahydro-4,7-methanoindan-5-yl-acrylate | g | 25 |
| Water | ml | 500 |
| Lauryl alcohol sulfate, sodium salt | g | 3.0 |
| Potassium persulfate | g | 1.0 |

A white powder was obtained which was filtered, washed well with water and dried. It weighed 96.6 g. and a nitrogen analysis showed that it contained 77% acrylonitrile. The polymer was dissolved in dimethylacetamide to give a smooth, viscous dope. A solution of 5 g. of the polymerized sodium salts of an alkyl naphthalenesulfonic acid (Daxad 15) in 50 ml. dimethylacetamide was added to the dope and it was dry-spun into fibers which dyed well with a selected list of basic dyes.

Example 27

The following materials were stirred with a sweep stirrer in a round-bottom flask for 24 hours at 45° C.:

| | Grams |
|---|---|
| Acrylonitrile | 279 |
| Ethyl acrylate | 21 |
| Dimethylformamide | 600 |
| 2-naphthalene magnesium sulfonate | 30 |
| Ammonium persulfate | 1.0 |

A smooth, viscous dope was obtained which was dry-spun into fibers. These fibers were drafted and knitted into a tube. This sock dyed deeply with basic dyes of all classes. This modified sock also showed improved resistance to soiling with oily dirt.

Example 28

The following materials were tumbled in a pressure bottle at 50° C. for 20 hours:

| | | |
|---|---|---|
| Acrylonitrile | g | 90 |
| N,N-dimethylacrylamide | g | 10 |
| Tert-butyl alcohol | ml | 500 |
| Acetyl peroxide | g | 1.0 |

The polymer was filtered, washed with isopropyl alcohol, and dried. It weighed 94 g. The polymer was added to a previously prepared solution of 8 g. of barium di(2-ethylhexyl)phosphate dissolved in 400 ml. dimethylsulfoxide and stirred until a smooth, viscous dope was obtained. Ths dope was wet-spun into fibers which dyed well with Sevron Yellow L and Sevron Brilliant Red 2B.

Example 29

Following the procedure of Example 23, fibers of poly (93 acrylonitrile-7 methyl acrylate) were spun containing 6% of the following chemicals.

(1) Dioctyl sodium sulfosuccinate
(2) Monobutyl biphenyl sodium monosulfonate
(3) Sodium tetrahydronaphthalene sulfonate
(4) Lauryl alcohol sulfate, sodium salt
(5) Dodecylbenzene sodium sulfate
(6) Dodecylbenzene lithium sulfonate
(7) Dodecylbenzene potassium sulfonate
(8) Dodecylbenzene barium sulfonate
(9) Naphthalene calcium sulfonate Skeins of these fibers dyed from medium to dark shades with selected basic dyes.

Example 30

Using the method of Example 26, a copolymer was prepared having the composition 80 acrylonitrile-20 norbornane-2-yl acrylate. The polymer was modified with 7% of di(2,2-dimethylhexyl) ether of sulfoisophthalic acid sodium salt. Fibers of this composition dyed well with Sevron Blue B.

Example 31

Using the method of Example 25, a dope having the composition 20% poly(90 acrylonitrile-10 methyl methacrylate) in dimethylformamide was spun into an aqueous 10% solution of octyl m-sulfobenzoate acid monolithium salt. After drafting the fibers dyed to a medium shade with basic dyes.

Example 32

Polyacrylonitrile fibers were spun containing 10% of the following salts:

(1) Disodium naphthylphosphonate
(2) Potassium dihexyl phosphite
(3) Lithium diphenylphosphonate
(4) Sodium diamyl phosphonite
(5) Disodium dodecylbenzenephosphonate The fibers dyed well with basic dyes.

These same compounds are also useful as additives for polyesters and poly-α-olefins. Amine salts of the phosphoric acid, phosphonic acid and other derivatives can be used.

By substituting any of the mentioned amine salt compounds for the salts specified in any of the preceding examples, generally similar modified polymers that are readily dyeable with basic dyes are obtained.

This invention has been described in detail with particular reference to preferred embodiments thereof, but it will be understood that variations and modifications can be effected within the scope and spirit of the invention, as described hereinabove and as defined in the appended claims.

What I claim is:

1. A process for preparing a fiber- and film-forming composition that is dyeable with basic dyes which comprises intimately and uniformly dispersing in a fiber- and film-forming synthetic resinous polymer that is normally difficult to dye with basic dyes from 0.1 to 25%, based on the total weight of the composition, of a salt having the general formula:

$$RXM$$

wherein R represents at least one organic radical and has a total molecular weight of about from 150 to 1000 and is selected from the group consisting of alkyl radicals, aryl radicals of the benzene, naphthalene and anthracene series and alkyl, aryl and halogen derivatives thereof, radicals of alkanedicarboxylic acid esters, radicals of N,N-dialkyl- and N,N,N',N'-tetraalkyl-substituted alkanecarboxamides, and alkylphenoxy ethylene radicals, X represents an acidic radical selected from the group consisting of the acidic radical of an oxyacid of phosphorus having a dissociation constant greater than $10^{-3}$ and the acidic radical of an oxyacid of sulfur having a dissociation constant greater than $10^{-3}$ and M represents a member selected from the group consisting of an alkali metal ion, an alkaline earth metal ion, the group $-NH_4$, and an organic amine ion selected from the group consisting of primary, secondary or tertiary amines.

2. The process according to claim 1 wherein the said polymer is a poly-α-olefin and said salt is dispersed in an amount from 2 to 15% by weight.

3. The process according to claim 1 wherein the said polymer is a polyester and said salt is dispersed in an amount from 2 to 15% by weight.

4. The process according to claim 1 wherein the said polymer is an acrylonitrile polymer containing at least 50% by weight of acrylonitrile in the polymer molecule and said salt is dispersed in an amount from 2 to 15% by weight.

5. The process according to claim 2 wherein the said salt is a metal salt of di(p-tert-butylphenyl)phosphoric acid.

6. The process according to claim 2 wherein the said salt is methylene polynaphthalene sodium sulfonate.

7. The process according to claim 2 wherein the said salt is dodecylbenzene sodium sulfonate.

8. The process according to claim 3 wherein the said salt is sodium diphenyl phosphate.

9. The process according to claim 3 wherein the said salt is dodecylbenzene sodium sulfonate.

10. The process according to claim 3 wherein the said salt is dioctyl sodium sulfosuccinate.

11. The process according to claim 3 wherein the said salt is anthraquinone-β-sulfonic acid, sodium salt.

12. The process according to claim 4 wherein the said salt is dodecylbenzene sodium sulfonate.

13. The process according to claim 4 wherein the said salt is isopropyl naphthalene sodium sulfonate.

14. A composition comprising a fiber- and film-forming synthetic resinous polymer that is normally difficult to dye with basic dyes, and a salt, said salt being present in said article in the amount of from 0.1 to 25% based on the weight of the article and said salt having the general formula:

$$RXM$$

wherein R represents at least one organic radical and has a total molecular weight of about from 150 to 1000 and is selected from the group consisting of alkyl radicals, aryl radicals of the benzene, naphthalene and anthracene series and alkyl, aryl and halogen derivatives thereof, radicals of alkanedicarboxylic acid esters, radicals of N,N-dialkyl- and N,N,N',N'-tetraalkyl-substituted alkanecarboxamides, and alkylphenoxy ethylene radicals, X represents an acidic radical selected from the group consisting of the acidic radical of an oxyacid of phosphorus having a dissociation constant greater than $10^{-3}$ and the acidic radical of an oxyacid of sulfur having a dissociation constant greater than $10^{-3}$ and M represents a member selected from the group consisting of an alkali metal ion, an alkaline earth metal ion, the group $-NH_4$, and an organic amine ion selected from the group consisting of primary, secondary or tertiary amines.

15. A fiber of the composition of claim 14, dyed with a basic dye.

16. A fiber of the composition of claim 14, dyed with a basic dye, wherein the said polymer is a poly-α-olefin.

17. A fiber of the composition of claim 14, dyed with a basic dye, wherein the said polymer is a polyester.

18. A fiber of the composition of claim 14, dyed with a basic dye, wherein the said polymer is an acrylonitrile polymer containing at least 50% by weight of acrylonitrile.

19. A process for preparing a dyed fiber which comprises the steps of (1) preparing a composition that is dyeable with basic dyes by intimately and uniformly dispersing in a fiber- and film-forming synthetic resinous polymer that is difficult to dye with basic dyes from 0.1 to 25%, based on the total weight of the said composition, of a salt having the general formula:

$$RXM$$

wherein R represents at least one organic radical and has a total molecular weight of about from 150 to 1000 and is selected from the group consisting of alkyl radicals, aryl radicals of the benzene, naphthalene and anthracene series and alkyl, aryl and halogen derivatives thereof, radicals of alkanedicarboxylic acid esters, radicals of N,N-dialkyl- and N,N,N',N'-tetraalkyl-substituted alkanecarboxamides, and alkylphenoxy ethylene radicals, X represents an acidic radical selected from the group consisting of the acidic radical of an oxyacid of phosphorus having a dissociation constant greater than $10^{-3}$ and the acidic radical of an oxyacid of sulfur having a dissociation constant greater than $10^{-3}$ and M represents a member selected from the group consisting of an alkali metal ion, an alkaline earth metal ion, the group $-NH_4$, and an organic amine ion selected from the group consisting of primary, secondary or tertiary amines, (2) forming a fiber from said composition and (3) dyeing the said fiber with a basic dye.

20. Composition according to claim 14 wherein said polymer is a poly-alpha-olefin and said salt is dispersed in an amount from 2 to 15% by weight.

21. Composition according to claim 14 wherein said polymer is a polyester and said salt is dispersed in an amount from 2 to 15% by weight.

22. Composition according to claim 14 wherein said polymer is an acrylonitrile polymer containing at least 50% by weight of acrylonitrile in the polymer molecule and said salt is dispersed in an amount from 2 to 15% by weight.

23. Composition of claim 20 wherein said salt is a metal salt of di(p-tert-butylphenyl) phosphoric acid.

24. Composition of claim 20 wherein said salt is methylene polynaphthalene sodium sulfonate.

25. Composition of claim 20 wherein said salt is dodecylbenzene sodium sulfonate.

26. Composition of claim 21 wherein said salt is sodium diphenyl phosphate.

27. Composition of claim 21 wherein said salt is dodecylbenzene sodium sulfonate.
28. Composition of claim 21 wherein said salt is dioctyl sodium sulfosuccinate.
29. Composition of claim 21 wherein said salt is anthraquinone-beta-sulfonic acid, sodium salt.
30. Composition of claim 22 wherein said salt is dodecylbenzene sodium sulfonate.
31. Composition of claim 22 wherein said salt is isopropyl naphthalene sodium sulfonate.

References Cited

UNITED STATES PATENTS

| | | | |
|---|---|---|---|
| 2,931,696 | 4/1960 | Wirth et al. | 260—85.5 |
| 2,773,856 | 12/1956 | Meyer | 260—85.5 |
| 2,899,262 | 8/1959 | Stanton | 8—55 |
| 3,043,811 | 7/1962 | Traylor | 8—55 |
| 3,327,021 | 6/1967 | Binsbergen | 260—878 |
| 2,877,204 | 3/1959 | Duhnkrack et al. | 260—75 |
| 3,148,017 | 9/1964 | Gogliaridi | 260—93.7 |
| 3,148,934 | 9/1964 | Brookens et al. | 260—75 |
| 3,160,618 | 12/1964 | Delacretaz | 260—85.5 |

FOREIGN PATENTS

| | | |
|---|---|---|
| 816,841 | 10/1956 | Great Britain. |
| 631,671 | 4/1963 | Belgium. |

JOSEPH L. SCHOFER, *Primary Examiner.*

HARRY WONG, JR., *Assistant Examiner.*

U.S. Cl. X.R.

260—30.8, 32.6, 32.8, 63, 85.5, 88.7, 88.2, 93.5, 78.5, 79.3, 93.7, 94.9, 860, 881, 896, 898; 264—78

UNITED STATES PATENT OFFICE
CERTIFICATE OF CORRECTION

Patent No. 3,432,472                                              March 11, 1969

John R. Caldwell

It is certified that error appears in the above identified patent and that said Letters Patent are hereby corrected as shown below:

Column 3, line 5, before "lithium" insert -- represents an ion derived from an alkali metal, e.g.,"; line 20, "alkal imetal" should read -- alkali metal --; line 34, "etc" should read -- etc. --. Column 12, line 53, "ether" should read -- ester --.

Signed and sealed this 14th day of April 1970.

(SEAL)
Attest:

Edward M. Fletcher, Jr.                              WILLIAM E. SCHUYLER, JR.
Attesting Officer                                              Commissioner of Patents